United States Patent [19]

Gault

[11] Patent Number: 5,726,111
[45] Date of Patent: Mar. 10, 1998

[54] PAPER/CLAY AND METHOD OF PREPARATION

[76] Inventor: Rosette Gault, 818 W. Crockett St. #410, Seattle, Wash. 98119

[21] Appl. No.: 67,114

[22] Filed: May 26, 1993

[51] Int. Cl.$^6$ .......................... C04B 33/00; C04B 33/04; C04B 33/36
[52] U.S. Cl. .......................... 501/141; 501/155; 106/487; 264/56
[58] Field of Search .................................. 501/155, 141; 106/486, 487, DIG. 4; 264/56

[56] References Cited

U.S. PATENT DOCUMENTS

| | | | |
|---|---|---|---|
| 3,607,331 | 9/1971 | Strether et al. | |
| 4,253,990 | 3/1981 | Gross | 502/63 |
| 4,255,200 | 3/1981 | Rheins | 501/141 |
| 4,343,751 | 8/1982 | Kumar | 264/37 |
| 4,356,060 | 10/1982 | Neckermann et al. | 162/189 |
| 5,032,227 | 7/1991 | Derrick et al. | |

OTHER PUBLICATIONS

Millot, "Clay", *Scientific American*, 240:109 (Apr., 1979).
Zamek, "Methane Gas and Sewer Sludge, New Routes to Efficiency in Firing Clay", *Studio Potter*, 13(1):85–86 (Dec., 1984).
Chou, Tsu–Wei et al., "Composites", *Scientific American*, pp. 193–203 (Oct., 1986).
Gault, Information Sheet (Fall, 1991) (no month).
Gault, "Amazing Paperclay", *Ceramic Monthly*, 40(6):96–99 (mailed May 26, 1992).
Gault, Information Sheet (Jun. 20–23, 1992).
Gartside, "Mix What With Clay?", *New Zealand Potter Magazine*, 35(3);32 (1993) (no month).
Gault, *Paper Clay for Ceramic Sculptors*, (1993 and 1995), Clear Light Books, Seattle, WA (no month).

*Primary Examiner*—Michael Marcheschi
*Attorney, Agent, or Firm*—Townsend and Townsend and Crew

[57] ABSTRACT

The present invention relates to a new and novel method of preparing and sculpting a fireable ceramic mixture and to the novel mixture itself, which comprises generally of adding cellulose fibers, that can be obtained from recycled or other papers to a liquid slip clay, resulting in a product mixture that is much lighter in weight and has stronger green strength. This resulting product mixture allows its use wet and/or dry and with the ability to vary the maturing temperature as desired.

15 Claims, No Drawings

PAPER/CLAY AND METHOD OF PREPARATION

TECHNICAL FIELD

The present invention generally relates to sculpturing and forming clay for other structures.

BACKGROUND OF THE INVENTION

Prior to the innovation of the present invention, ceramist who work with conventional clay for the sculpturing of figures and other structures find their material fragile when dry, and dense and heavy when fired. The clay/pulp mix of the present invention is up to fifty (50) percent lighter. The larger structures tend to warp and crack, and as such, restrict and incur problems in drying. Conventional clay particles are extremely small and are not strong until they have been fired in the kiln. The use of additives such as sand, grog, deflocculents and various manmade compositions, such as nylon, dacron, fiberglass, polypropylene, etc., are known to strengthen clay in the green and fired state. However, these materials lack certain properties as an additive to a clay body which cellulose fibers provide, no matter what the source of cellulose may be, i.e., cotton, linen, flax, or wood, that has been processed into paper.

There is no longer a need to cover a structure with plastic to protect it against uneven drying and to avoid cracks and shrinkage. If cracks do appear in the structures made with a clay/pulp mixture of the present invention, a repair can easily be made with the clay/pulp mix. Repairs of dry forms made in a conventional system have a high risk of cracking. Glaze particles and fragments may be added into wet forms which are not possible with conventional clays. Also, there is no problem in the forming of thick areas near thin areas. This can not be done with the conventional clays without cracks from shrinkage differences.

The following art has been found to be related to the field of the present invention but in no way do either of the herein cited references anticipate or even suggest the novel advance in the art that the present invention makes.

U.S. Pat. No. 3,607,331, issued to Strether, etal., on Sep. 21, 1971 entitled CLAY-STARCH PAPER COATING COMPOSITIONS discloses a clay-starch paper coating composition having increased adhesion on paper when mixed with a small amount of a copolymer of polyalkylenimine and an epihalohydrin. The copolymer insolubilizes the starch binder and thus increases its effectiveness in water resistant applications. There is nothing in this reference to suggest the process and the resulting mixture of clay and paper for use in forming figures and other structures.

U.S. Pat. No. 5,032,227, issued to Derrick, etal., on Jul. 16, 1991, entitled PRODUCTION OF PAPER OR PAPERBOARD discloses the improvement of the drainage properties of mechanical pulps in the paper making process by including in the thin stock, not after the last point of high shear, particles of a water dispersible colloid siliceous material such as bentonite clay in intimate association with a low molecular weight water soluble high anionic change density polymer. As with Strether, etal., above, this reference, in no way, even suggests the process and the resulting clay/paper mixture of the present invention for ceramic figure forming, along with other structures.

OBJECTS OF THE INVENTION

THE OBJECT OF THE PRESENT INVENTION

It is the object of the present invention to provide a process and resulting mixture for the ceramic figure form industry that is much lighter and can be formed into an increased variety of shapes than the presently available mixtures.

Another object of the present invention is to provide a process and resulting mixture for the ceramic figure forming industry where the formed slabs will not warp regardless of size and significantly reduce the drying problems.

An additional object of the present invention is to provide a process and resulting mixture for the ceramic figure forming industry that has super green strength.

A further object of the present invention is to provide a process and resulting mixture for the ceramic figure forming industry that allows elimination of fatal cracks that can appear in the drying process and will allow artists to make difficult repairs and build new forms over the dry structure.

Still another object of the present invention is to provide a process and a resulting mixture for the ceramic figure forming industry which allows an artist to insert bisque or glaze fragments into wet forms without the problems of cracking.

A still further object of the present invention is to provide a process and a resulting mixture for the ceramic figure forming industry which provides the ability to form thick areas in close vicinity of thin areas of figures and other structures.

DISCLOSURE OF THE INVENTION

These and other objects of the present invention are provided by following the steps of the process of the present invention which comprises first preparing the paper pulp by providing an uncoated paper or source of cellulose supply. This paper supply may be shredded paper from offices, schools, factories, etc. The best type of cellulose fiber for these purposes us, generally, shorter lengths of fiber, which are commonly found in uncoated office/copier papers, or uncoated brochure card stock, or blotter papers any unsized paper, even toilet paper. In other words, any paper which tears easily and which breaks down to the fibrous condition in water easily. Place the shredded paper in a mixing vessel sufficiently large to allow the complete and full saturation with clean hot water. The temperature while not critical, does effect the speed of the soaking process. In order to more fully homogenize the paper pulp, use a glaze-mixing blunger to stir the paper water mixture until fully saturated and the fibers are dispersed in the water. A small amount of a liquid bleach may be optionally added to the mix at this time, if it is planned to store the pulp-water mixture for a period of a week or more. Dry clay, in powdered form, may be directly added to the pulp water mixture and blunged together into a consistency that resembles oatmeal for the best results. One can also achieve a good paper clay mixture by first preparing a pulp, by blunging shredded papers of the type referred supra., extracting most of the water by straining or sieving the paper soup in a mesh screen, and adding the wet pulp to a ready prepared clay which has been liquefied to a smooth honey consistency. The principle of the present invention is that each cellulose fiber will be surrounded by millions of microscopic clay particles in a solution of water, then a the water evaporates, microscopic resilient hollow cellulose fibers will be absorbed uniformly throughout the matrix. It is important that the shredded papers have been sufficiently beaten or broken down into fibers so best results will be achieved.

An appropriate clay is selected depending upon the desired texture, color, type of job, etc. In order to obtain a fine surface, for example, a refined clay casting slip or porcelain clay should be utilized, as well as using the highest rag-content paper to form the pulp-mix. The selected clay should be mixed with water in sufficient amounts to form a slip with about the consistency of honey at standard laboratory temperature. An optional deflocculant may be added to the slip mix if desired.

The paper-clay slip is formed by blending the paper pulp into the clay slip in an amount of from about 10% or 20% to about 50% by volume. The higher the cellulose content of the paper-clay slip, the lighter and more porous the fired product. A large percentage of cellulose content in the paper-pulp slip could raise the maturation temperature because of the clays added to commercial papers being recycled. The paper-clay slip is continuously mixed with a blunger and when the desired consistency of the pulp mixture content is reached the product is ready. The paper-clay product can now be hand cast, cast in plaster molds or poured out onto large plaster bats to make slabs and tubes plus shapes and forms, up to 4' thick if desired.

The following are Examples of the process of the project of the present invention:

EXAMPLE 1

In a 5 liter container put 3.0 liters by vol. of shredded copier paper, pour in 3 liters of 100 degree C clear water, homogenize the mixture with a large blunger for ten minutes. The mixture is placed on a 50 mesh screen and pressed lightly to squeeze out the water. Pulp is placed in a water tight container. A white porcelain clay slip is mixed with 40% pulp by vol. and mixed completely with a blunger. Excess water is removed and the mixture is allowed to dry to desired consistency for use. The product is poured into a plaster figure mold.

EXAMPLE 2

In a 10 liter container put 3.5 liters by vol. of shredded computer paper, pour in 8 liters of 120 degree C clear water, homogenize the mixture with a large blunger for fifteen minutes. The mixture is placed on a fine screen and pressed lightly to squeeze out the water. The wet pulp is placed in a water tight container. A red earthenware clay slip is mixed with 20% pulp by vol. and mixed completely with a blunger. Excess water is removed and the mixture is allowed to dry with occasional stirring to desired consistency. The product is poured onto a slab and wedged into Hastic molding clay.

While the present invention has been described in conjunction with the preferred specific embodiments thereof, it will be understood that this description and the included Examples are intended to illustrate and not to limit the present invention, which is limited only by the scope of the appended claims.

What I claim is:

1. A method of preparing a ceramic mixture that retains a shape and can be fired in a kiln to produce a ceramic figure, comprising the steps of:
   preparing a paper pulp from a cellulose-containing non-coated paper; and
   adding the paper pulp to a liquid slip ceramic clay to form a paper/clay emulsion and mixing said paper/clay emulsion to a consistency suitable for forming a product for ceramic firing.

2. The method of claim 1 wherein said cellulose-containing paper is uncoated copier, computer, typewriter paper, brochures, card stock or any non-coated printed materials.

3. The method of claim 1 wherein said clay of said liquid ceramic clay slip is selected from the group consisting of refined ceramic clay, unrefined ceramic clay and porcelain.

4. The method of claim 1 wherein said paper/clay emulsion consists of from about 10 percent to about 50 percent by volume cellulose-containing pulp.

5. The method of claim 1 further comprising the steps of forming the paper/clay emulsion into a product and firing the formed product in a kiln.

6. The method according to claim 1, wherein the paper pulp is prepared from the cellulose containing paper by mixing the paper with water.

7. The method according to claim 6, wherein the paper is shredded before mixing with water.

8. The method according to claim 7, wherein the paper and water are blunged to form a homogeneous mixture.

9. The method according to claim 1, wherein after the step of preparing the paper pulp, said paper pulp is strained or sieved before it is added to the liquid slip ceramic clay.

10. The method of claim 1, further comprising the step of adding a deflocculant to the paper/clay emulsion.

11. A method for preparing a ceramic mixture that retains a shape and can be fired in a kiln, comprising the steps of:
   preparing a paper/water mixture from a cellulose-containing paper;
   adding to the paper/water mixture an amount of powdered ceramic clay sufficient to form a paper/clay emulsion; and
   mixing said paper/clay emulsion to a consistency suitable for forming a product for ceramic firing.

12. The method of claim 11, wherein said cellulose-containing paper is a non-coated printed material.

13. The method of claim 12, wherein the powdered ceramic clay is refined clay, unrefined clay or porcelain.

14. The method of claim 11, wherein said paper/clay emulsion comprises from about 10 percent to about 50 percent by volume paper pulp.

15. The method of claim 12, further comprising the steps of forming the paper/clay emulsion into a product having a shape and firing the formed product in a kiln.

* * * * *